US006456142B1

(12) United States Patent
Gilbert

(10) Patent No.: US 6,456,142 B1
(45) Date of Patent: Sep. 24, 2002

(54) CIRCUIT HAVING DUAL FEEDBACK MULTIPLIERS

(75) Inventor: Barrie Gilbert, Portland, OR (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/724,679

(22) Filed: Nov. 28, 2000

(51) Int. Cl.[7] .................................................. G06F 7/44

(52) U.S. Cl. ........................ 327/356; 327/358; 327/361

(58) Field of Search ................................ 327/356, 357, 327/358, 361, 355, 119, 352, 363, 407, 408; 330/75, 85, 96, 97, 102–105, 129–135

(56) References Cited

U.S. PATENT DOCUMENTS

| | | | | |
|---|---|---|---|---|
| 4,006,353 A | * | 2/1977 | Pierce | 235/194 |
| 4,156,283 A | * | 5/1979 | Gilbert | 364/841 |
| 4,586,155 A | * | 4/1986 | Gilbert | 364/841 |
| 4,894,845 A | * | 1/1990 | Jansenn et al. | 375/83 |
| 5,157,350 A | * | 10/1992 | Rubens | 330/254 |
| 5,187,682 A | * | 2/1993 | Kimura | 364/841 |
| 5,389,840 A | * | 2/1995 | Dow | 327/357 |
| 5,650,743 A | * | 7/1997 | Bien et al. | 327/359 |
| 5,659,263 A | * | 8/1997 | Dow et al. | 327/356 |
| 5,925,094 A | * | 7/1999 | Kimura | 708/835 |
| 6,255,889 B1 | * | 7/2001 | Branson | 327/359 |

OTHER PUBLICATIONS

A New Wide–Band Amplifier Technique by Barrie Gilbert, IEEE J. Solid–State Circuits, vol. SC–3, pp. 353–365, Dec. 1968;.

A High–Performance Monolithic Multiplier Using Active Feedback by Barrie Gilbert, IEEE J. Solid–State Circuits, vol. SC–9, No. 6, pp. 364–373, Dec. 1974.

Data sheet for Internally Trimmed Precision IC Multiplier AD534 by Analog Devices, pp. 1–12, 1999.

Data sheet for 60 MHz, 2000 V/μS Monolithic Op Amp AD844 by Analog Devices, pp. 1–12, 1990.

The current conveyor: history, progress and new results by A.S. Sedra, G.W. Roberts and F. Gohn, IEE Proceedings, vol. 137, Pt. G, No. 2, Apr. 1990.

* cited by examiner

*Primary Examiner*—Timothy P. Callahan
*Assistant Examiner*—Hai L. Nguyen
(74) *Attorney, Agent, or Firm*—Marger Johnson & McCollom, P.C.

(57) ABSTRACT

An analog multiplier circuit utilizes a dual feedback structure, in which two multiplier core sections can be progressively enabled or disabled to varying degrees, thereby providing variable gain while maintaining constant bandwidth. The multipliers are preferably controlled by a pair of ratiometric gain control signals in a manner that provides very accurate end-point gain. A summing device combines the outputs from the multipliers to generate a final output signal that is buffered and fed back to the multipliers through two separate feedback paths. The circuit can operate as a video keyer that linearly selects between two input signals applied to the multipliers. Alternatively, the circuit can be operated as a variable gain amplifier (two quadrant multiplier) when one of the two inputs is not used. Each of the multipliers is preferably implemented with sets of differential transistor pairs having complementary symmetry and a Class AB current conveyor input. The outputs of the multipliers can be coupled to a transimpedance node through current mirrors, thereby providing push-pull drive that is free of slew-rate limitations.

38 Claims, 10 Drawing Sheets

CIRCUIT HAVING DUAL FEEDBACK MULTIPLIERS

BACKGROUND

A prior art analog multiplier is shown in block diagram form in FIG. 1 and in more detailed schematic form in FIG. 2. Referring to FIG. 1, the circuit includes a translinear multiplier core 10 which is driven by two identical input amplifiers 12 and 14. The input amplifiers are transconductance (gm) stages which convert the input voltages $V_X$ and $V_Y$ into currents $I_X$ and $I_Y$. The multiplier core generates an output current $I_{OUT}$ proportional to the product of $V_X$ and $V_Y$ divided by a scale factor SF:

$$I_{OUT} = \left(\frac{V_X V_Y}{SF}\right) \quad \text{(Eq. 1)}$$

Referring FIG. 2, the translinear multiplier core is implemented as a pair of emitter-coupled transistors Q3, Q4 which are preceded by a classic arrangement of pre-distortion diodes Q1 and Q2 that predistort the X input signal so as to compensate for the hyperbolic tangent (tanh) characteristic of the emitter-coupled pair, thereby extending the linear input range. For simplicity, the input amplifiers 12 and 14 are not shown in FIG. 2. Instead, the "X" input is shown generically as $(1-X)I_X$ and $(1+X)I_X$, where X is a modulation factor that varies between −1 and +1. The "Y" input is shown as the current $(1-Y)I_Y$, where Y varies between −1 and +1.

The circuit shown in FIGS. 1 and 2 suffers from several sources of error. Although these errors have been analyzed in detail in B. Gilbert, "A Precise four-quadrant multiplier with subnanosecond response," *IEEE J. Solid State Circuits*, vol. SC-3, pp. 365–373, December 1968, a few will be summarized here. First, any mismatch in the emitter area ratios of Q1 through Q4 causes even-order distortion. More specifically, if $A_1$ through $A_4$ are the emitter areas of Q1 through Q4, respectively, then there is no distortion in the ideal case where:

$$\frac{A_1}{A_2} \cdot \frac{A_4}{A_3} = 1 \quad \text{(Eq. 2)}$$

Any inaccuracy in area the area ratios, however, causes even-order distortion as shown in FIG. 3. The solid line in FIG. 3 illustrates the ideal output characteristic of $I_{OUT}$ for a given value of Y, as X is swept from −1 to +1, whereas the broken line shows the actual output characteristic when there is a mismatch in the emitter area ratios.

An additional source of error is the ohmic resistance associated with transistors Q3 and Q4. This introduces odd-order distortion as shown in FIG. 4, where the solid line shows the ideal output characteristic, and the broken line shows the actual output characteristic caused by the ohmic resistances of the transistors.

Another source of error is the distortion introduced by the gm stages used to convert the input voltages to currents. FIG. 5 illustrates a typical gm stage used to generate the input currents to the translinear multiplier. The circuit of FIG. 5 is shown configured to generate the $(1-Y)I_Y$ input to the translinear multiplier (the $(1+Y)I_Y$ output from Q6 is diverted to ground), but an identical circuit could also be used generate the "X" inputs as well. Curves 13, 15 and 17 in FIG. 6 illustrate the incremental gain of this gm stage for increasing values of the emitter resistor $R_Y$, respectively.

From FIG. 6, it is apparent that the curvature of the incremental gain near the gain axis can be reduced, and therefore, the linearity improved, by increasing the value of $R_Y$. However, this also reduces the sensitivity of the gm stage and introduces a noise penalty because $R_Y$ is a significant noise generator. Moreover, the non-linearity of this stage is never completely eliminated.

A well-known technique for reducing the distortion of a circuit element is to close a negative feedback path around the element. A prior art circuit that attempts to use feedback in the context of a multiplier is shown in block diagram form in FIG. 7 and in more detailed schematic form in FIG. 8. Referring to FIG. 7, a third input amplifier 16 for receiving a "Z" input has been added to the circuit of FIG. 1. A high gain amplifier 18 nulls the output from the multiplier core and the output from the Z amplifier (attenuated by network 19) to produce the final output signal $V_{OUT}$. The output signal is fed back to the Z amplifier through a feedback path including resistors R1 and R2.

Because the X, Y, and Z input amplifiers 12, 14, and 16 are identical, the circuit of FIGS. 7 and 8 reduces the distortion introduced by the X and Y amplifiers. This circuit does not, however, reduce the distortion introduced by the multiplier core because the feedback path is not closed around the multiplier core. If the final output signal $V_{OUT}$ is fed back to the Y input amplifier in an effort to close the feedback loop around the multiplier core as shown in FIG. 9, the circuit ceases to function as a multiplier. Instead, it behaves as a divider with the Z input providing the numerator and the X input providing the denominator:

$$V_{OUT} = \frac{SF \cdot (V_{X+} - V_{X-})}{(V_{Z-} - V_{Z+})} \quad \text{(Eq. 3)}$$

A further problem with such a feedback arrangement is that the bandwidth is now proportional to the magnitude of the denominator as shown in FIG. 10. That is, bandwidth is obtained at the expense of gain, as is well-known when utilizing negative feedback.

Another aspect of the multiplier circuits described above is that the gain is only well-defined at the minimum end of the gain range, but the maximum gain is not defined. That is, when the Y input is zero, the output is zero for any value of the X input, but as the Y input increases, the gain continues to increase indefinitely. There are applications, however, where a well-defined maximum gain is useful, as for example, with a video keyer.

DETAILED DESCRIPTION

The present invention utilizes dual feedback multipliers to achieve various benefits including constant loop bandwidth, improved linearity, and precise end-point gain, depending on the actual implementation. The present invention, however, is not limited to any specific embodiment, and it should be apparent that, although the principles of the present invention will be described with reference to the example embodiments illustrated below, the present invention can be modified in arrangement and detail without departing from such principles.

Figure 11:
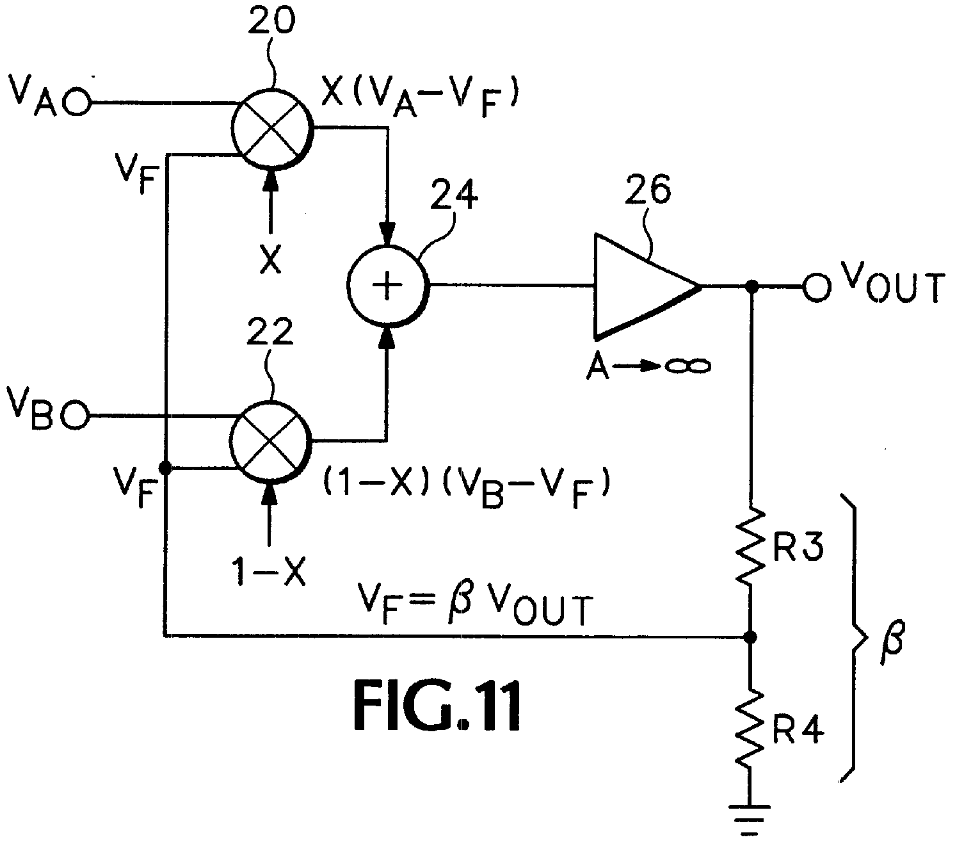
FIG. 11 is a block diagram of a circuit in accordance with the present invention.

FIG. 11 is a block diagram of an embodiment of a circuit in accordance with the present invention. The circuit of FIG. 11 includes two multiplier cells 20 and 22, each having an output connected to a summing device 24. The output from the summing device is applied to a high-gain amplifier 26 to generate the output signal $V_{OUT}$. $V_{OUT}$ is attenuated by the factor β and fed back to the inverting inputs of both multipliers as $V_F$. The factor β is determined by the values of resistors R3 and R4 which form the feedback network. Separate feedback networks can be coupled between $V_{OUT}$ and the $V_F$ inputs of multiplier cells 20 and 22 to independently set the overall gain of each part of the system. A gain control signal X, which varies between a normalized range of one and zero, is applied to the first multiplier. A complementary signal 1−X is applied to the other multiplier.

The output from the first multiplier is $X(V_A-V_F)$, and the output from the second multiplier is $(1-X)(V_B-V_F)$. Assuming the amplifier 26 has a very high gain of $-A_0$, the output signal $V_{OUT}$ is given by:

$$V_{OUT}=\frac{A_0}{1+\beta A_0}[XV_A-(1-X)V_B] \quad \text{(Eq. 4)}$$

where $$\frac{A_0}{1+\beta A_0}\rightarrow 1 \quad \text{(Eq. 5)}$$

as $A0\rightarrow\infty$. Thus, the output is $V_A$ when X=0, and the output is $V_B$ when X=1. The gain can also be made very accurate in all cases, but especially so when one of the channels is fully selected—that is, when X is one or zero. The endpoint gain of the system is determined solely by the attenuation of the feedback paths. When one of the multipliers is filly on and the other is fully off, the gain of the active channel is defined by the feedback path because the multiplier that is fully on behaves as a differencing stage that simply responds to the difference between the input signal $V_A$ and the feedback signal $V_F$. Therefore, it is possible to achieve very accurate endpoint gain.

Figure 1:
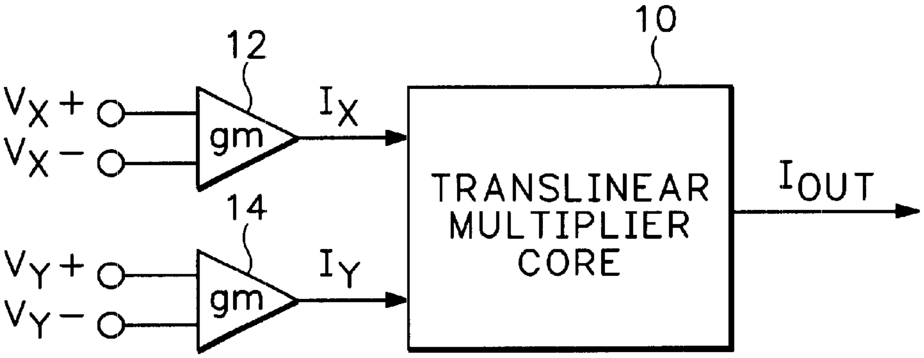
FIG. 1 is a block diagram of a prior art multiplier.
Figure 2:
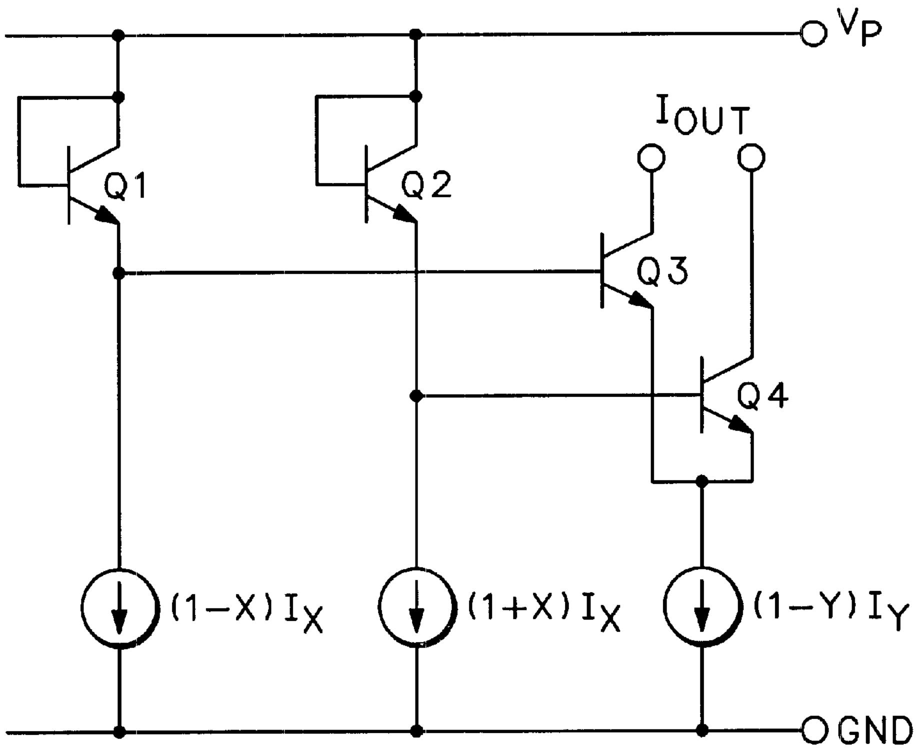
FIG. 2 is a schematic diagram showing more details of the multiplier of FIG. 1.
Figure 3:
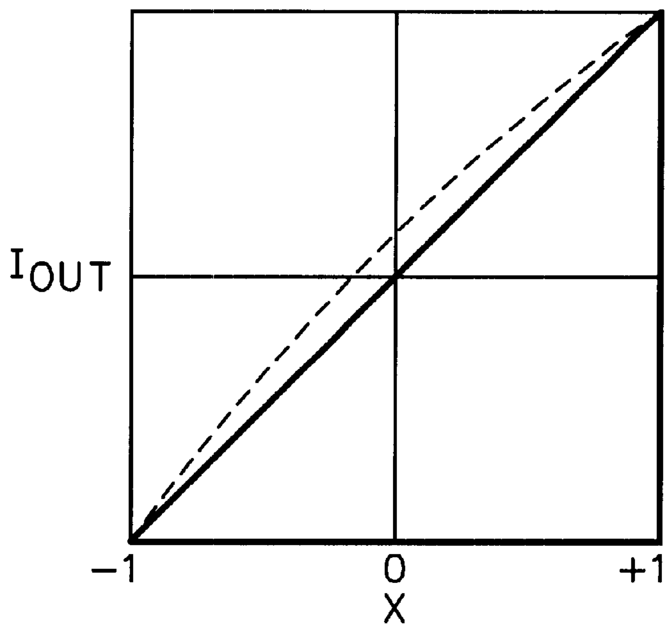
FIGS. 3 and 4 illustrate the effects of even and odd-order distortion in the circuit of FIGS. 1 and 2.
Figure 4:
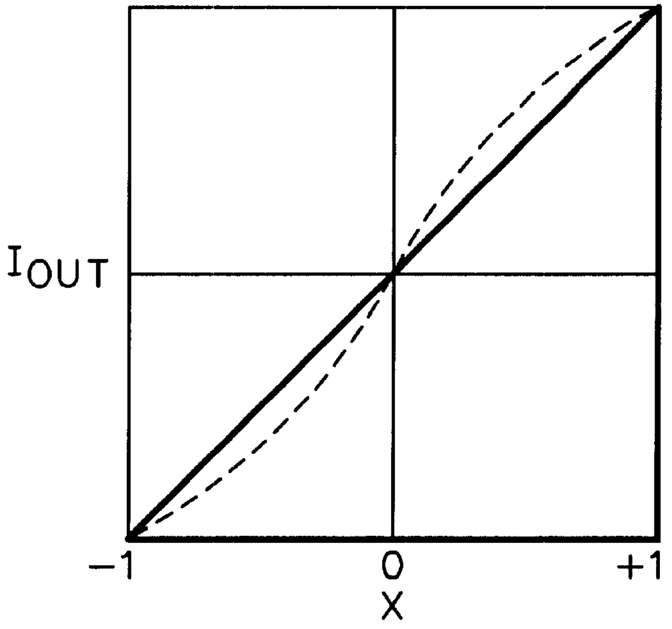
Figure 5:
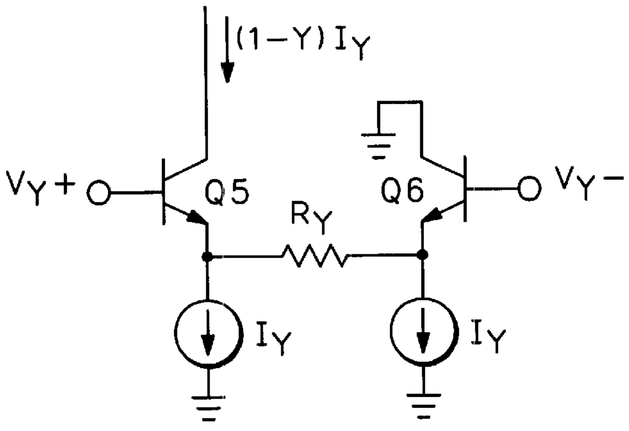
FIG. 5 is a schematic diagram of a prior art transconductance (gm) input stage used with the circuit of FIGS. 1 and 2.
Figure 6:
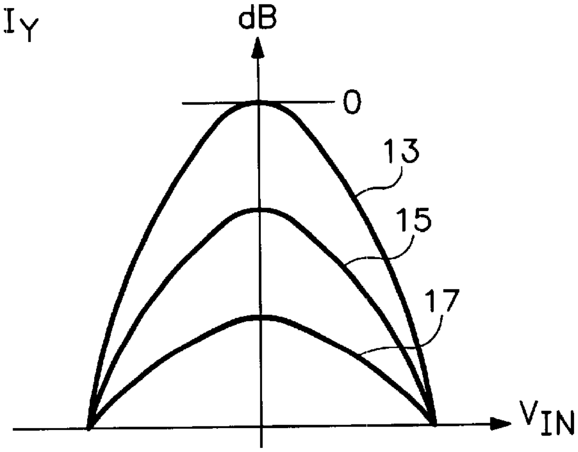
FIG. 6 illustrates the incremental gain of the gm stage of FIG. 5 for several different values of emitter resistor.
Figure 7:
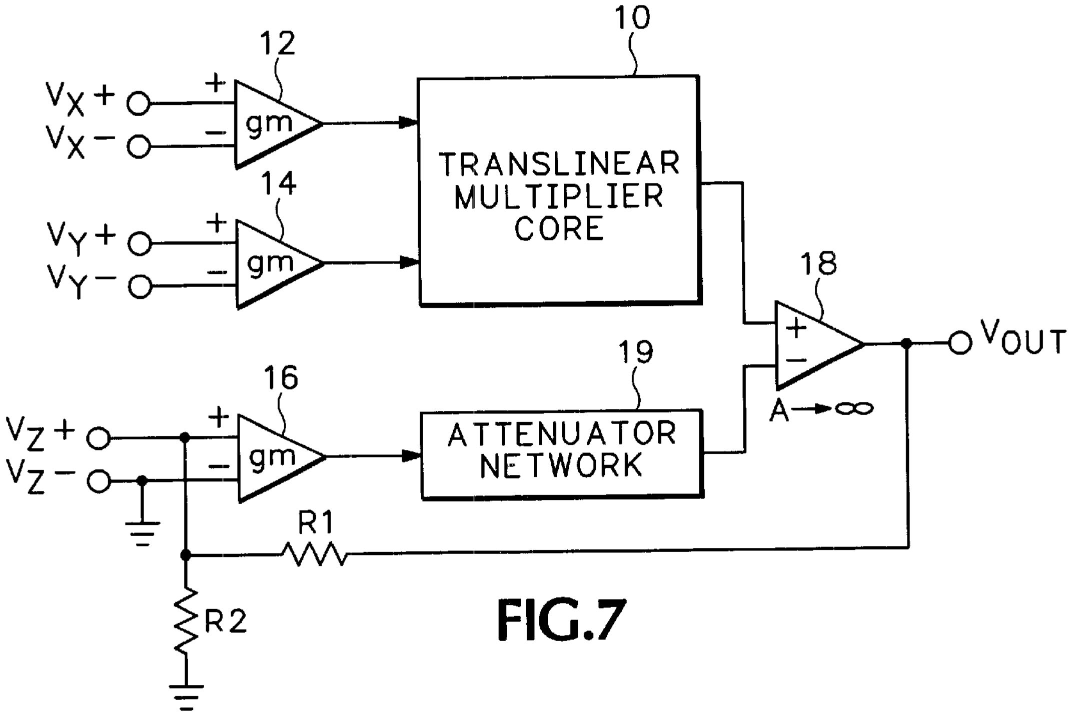
FIG. 7 is a block diagram of another prior art multiplier.
Figure 8:
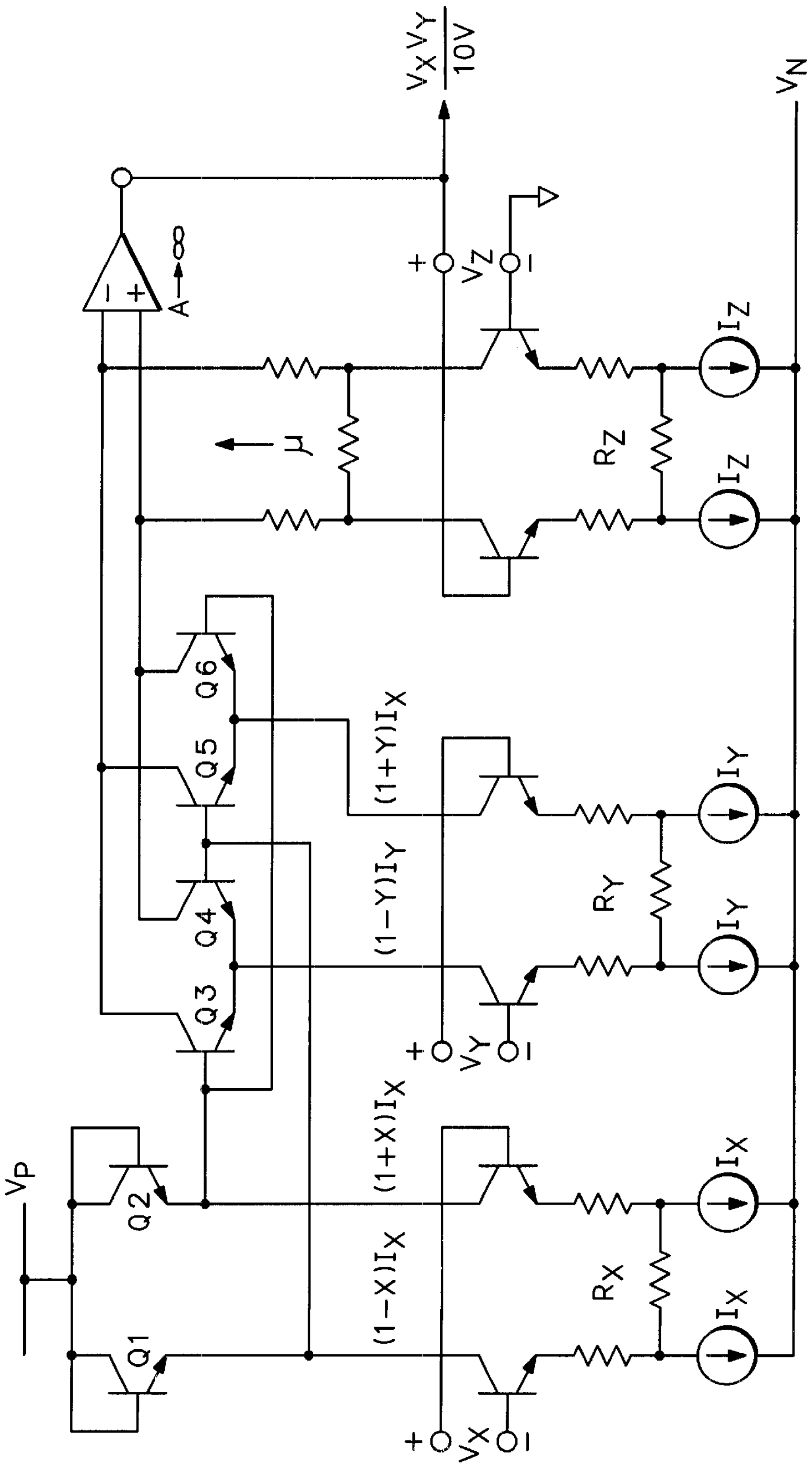
FIG. 8 is a schematic diagram showing more details of the multiplier of FIG. 7.
Figure 9:
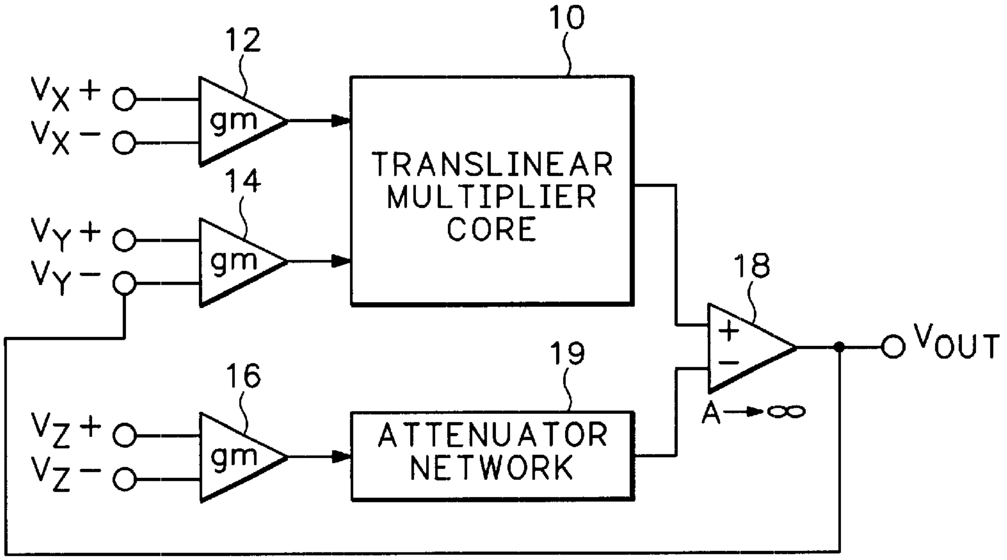
FIG. 9 is a block diagram show in the circuit of FIG. 7 reconfigured as a divider.
Figure 10:
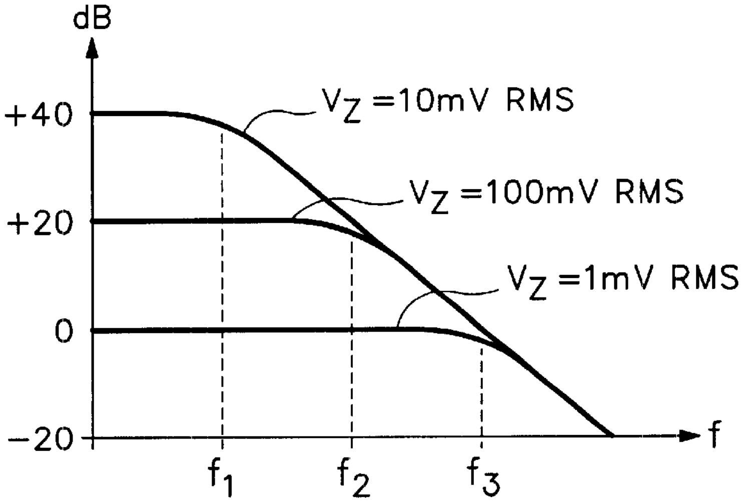
FIG. 10 illustrates the frequency response of the circuit of FIG. 9.
Figure 12:
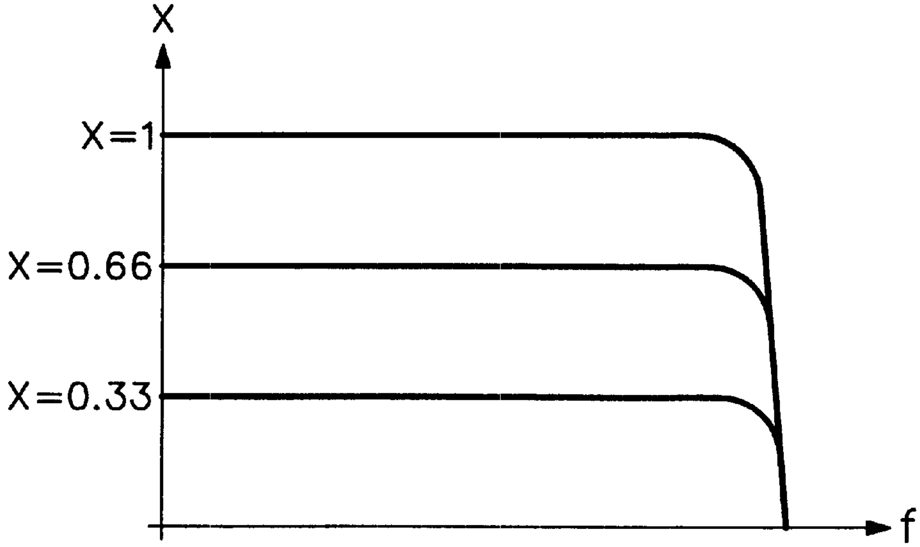
FIG. 12 illustrates the frequency response of the circuit of FIG. 11.

Another advantage of the circuit of FIG. 11 is that it provides constant bandwidth as shown in FIG. 12. This is in contrast to the circuit of FIG. 9 in which the bandwidth depends on the value of the gain control signal X. With the circuit of FIG. 11, however, the weak feedback in the channel having a lower gain control signal is balanced by the stronger feedback in the other channel which has a higher gain control signal. Therefore, the overall loop gain and bandwidth remains constant.

If two separate input signals are applied to the $V_A$ and $V_B$ inputs, the circuit of FIG. 11 can operate as a keyer. For example, if two video signals are applied as the $V_A$ and $V_B$ and, the output signal $V_{OUT}$ fades from one signal to the other as X is varied from zero to one. Alternatively, one of the inputs can be AC grounded, in which case the system functions as a variable gain amplifier (VGA) having constant loop gain and bandwidth.

Figure 13:
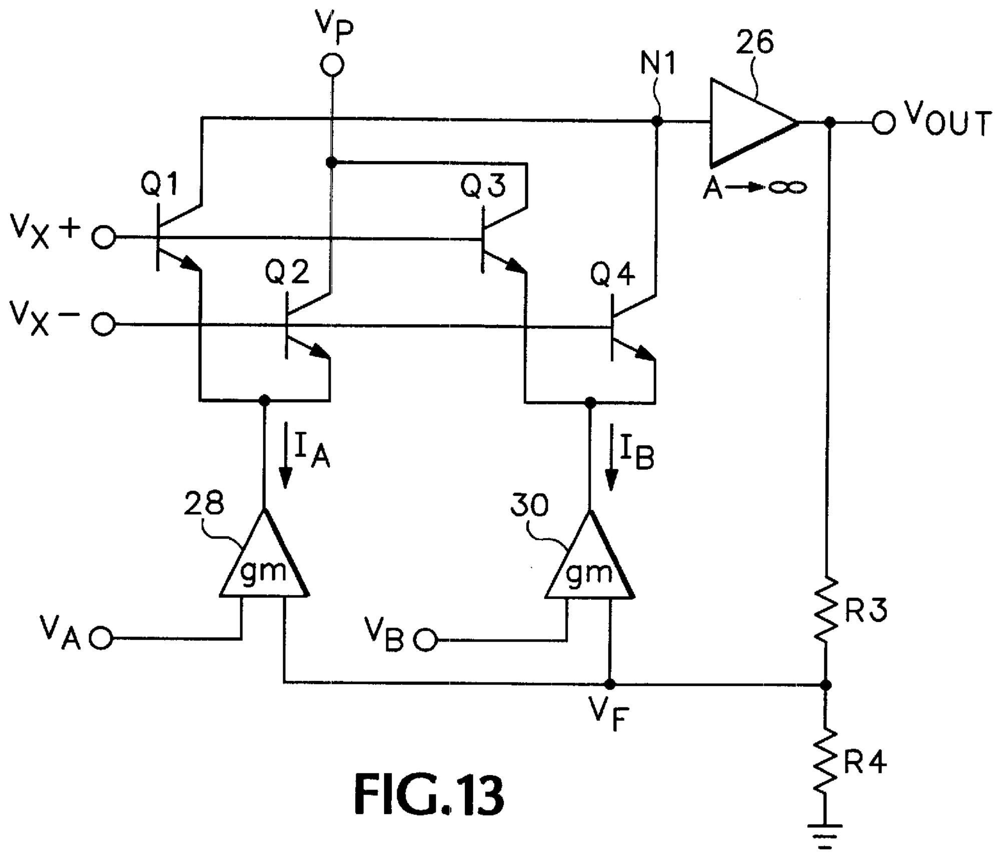
FIG. 13 is a schematic diagram of another embodiment of a circuit in accordance with the present invention.

FIG. 13 illustrates a more detailed embodiment of a circuit in accordance with the present invention. In the system of FIG. 13, the multiplier cores are formed from differential pairs of emitter-coupled transistors Q1, Q2 and Q3, Q4, respectively. The multiplier cores Q1, Q2 and Q3, Q4 are driven by transconductance (gm) cells 28 and 30, respectively. The differential pairs are connected in anti-phase, wherein one transistor in each pair is diverted to the positive power supply $V_P$. Since the outputs from the multipliers are currents, the summing device can be implemented as a simple wire connection at node N1. Although not shown in FIG. 13, some type of load would be necessary to provide the current through Q1 and Q4. Rather than utilizing separate gain control signals for each multiplier, a single gain control signal $V_X$ is applied to the bases of both differential pairs. Since the outputs are added in anti-phase, the result is the same as if complementary gain control signals where applied to the two separate multipliers.

It is preferable for the gm cells have low distortion because when channel A is operating at low gain, there is very little feedback through that channel, so the distortion (in channel A) is determined primarily by the distortion of the gm cell in the A channel.

Figure 14:
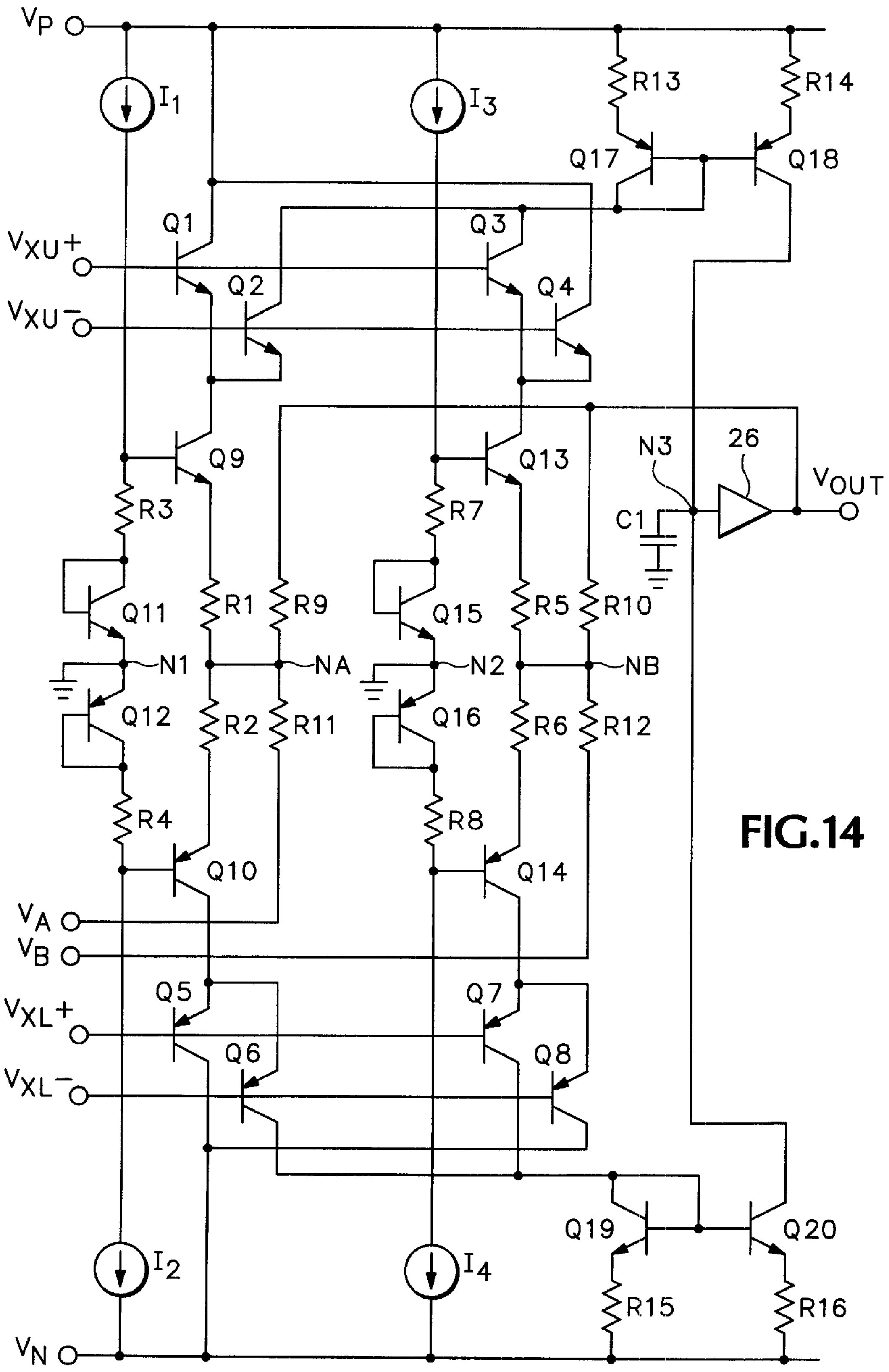
FIG. 14 is a schematic diagram of another embodiment of a circuit in accordance with the present invention.

FIG. 14 shows a preferred embodiment of a circuit in accordance with the present invention. As with the circuit of FIG. 13, the circuit of FIG. 14 includes two multipliers that are serviced by two separate feedback paths. However, each of the multipliers in FIG. 14 includes a second, complementary multiplier core. Moreover, the multiplier cores are driven by current conveyors rather than gm cells. Specifically, the first multiplier in FIG. 14 includes a first multiplier core Q1, Q2 and a second core Q5, Q6 of the opposite polarity. Transistors Q9 through Q12 form a class AB current conveyor which is coupled between the common emitter nodes of the two multiplier cores. Transistors Q11 and Q12 are diode-connected and biased by currents $I_1$ and $I_2$, respectively. Since the emitters of Q11 and Q12 are connected to ground at node N1, node NA behaves as a virtual ground, and Q9 and Q10 convey any input current at node NA to the common emitter nodes of cores Q1, Q2 and Q5, Q6.

The second multiplier is identical to the first and includes first and second multiplier cores Q3, Q4 and Q7, Q8, a current conveyor formed from Q13 through Q16, and current sources $I_3$, and $I_4$.

The current conveyors in the first and second multipliers preferably include emitter degeneration resistors R1 through R8 which improve the linearity of the system as described in more detail below. Complementary gain control signals $V_{XL}$ and $V_{XU}$ are applied to the upper and lower cores as described below. The outputs of the NPN multiplier cores Q1, Q2 and Q3, Q4 are combined in anti-phase with one of the currents being diverted to the positive power supply $V_P$, and the other driving a current mirror Q17, Q18. Likewise, the outputs of the PNP cores Q5, Q6 and Q7, Q8 are combined in anti-phase with one of the currents being diverted to the negative power supply $V_N$, and the other driving current mirror Q19, Q20. The outputs from the current mirrors are combined at a high impedance summing node N3 which is buffered by a unity gain amplifier 26 to provide the final output signal $V_{OUT}$. The unity gain frequency is set by a compensation capacitor C1 coupled between node N3 and ground. Alternatively, cascode transistors could be used instead of the current mirrors.

Resistor R9 forms a first feedback path from $V_{OUT}$ to node NA, while R10 forms the second feedback path from $V_{OUT}$ to node NB. For RF applications, the inputs are preferably compatible with 50 ohm systems. By applying the $V_A$ and $V_B$ inputs to nodes NA and NB through resistors R11 and R12, respectively, the resistors can be sized to provide 50 ohm inputs. By judicious selection of resistors R1 through R12, third-order harmonic distortion in the current conveyors can be cancelled completely, while at the same time, the input impedance can be set to the desired value.

Turning first to the linearity issue, the third-order harmonic distortion of the current conveyor is cancelled when the resistances of R1 through R4 are approximately one-half the incremental resistance $r_e$ of their corresponding transistors. The incremental resistance of a BJT transistor is given by $r_e=V_T/I_C$ where $V_T$ is the thermal voltage ($V_T\approx 26$ mV at 300° K) and $I_C$ is the quiescent value of the collector current through the transistor. Thus, if Q11 and Q12 have a collector current of about 500 $\mu$A, $r_e$ is about 50 ohms, and R3 and R4 should be about 25 ohms. Transistors Q9 and Q10 preferably have twice the emitter areas of Q11 and Q12, so their collector currents are about 1mA, and $r_e$ is about 25 ohms. Thus, $R_1$ and R2 should be about 12 ohms.

Turning next to the input impedance, if the feedback system had infinite gain, node NA would be a perfect virtual ground, and the input impedance could be set by simply setting R1 to 50 ohms. However, the gain at high frequencies, which is set by the capacitor C1 at node N3, is not infinite, so the resistances of R1, R2, and R11 must be considered as well. Values of 45 ohms and 180 ohms for R9 and R11, respectively, have been found to yield good results.

One advantage of the circuit of FIG. 13 is that it utilizes current mode feedback. Feedback is generally difficult to utilize at high frequencies because parasitic capacitances cause undesirable phase shift in voltage signals around the loop. In the circuit of FIG. 14, the only voltage mode signal is $V_{OUT}$ which is immediately converted back into a current signal when fed back to nodes NA and NB. Thus, feedback can still be utilized at very high frequencies.

A further advantage of the circuit of FIG. 14 is that the complementary arrangement provides very high on-demand current to node N3, thereby eliminating slew rate limitations. A further benefit of the complementary arrangement is that, in principle, there is no limit to the amount of input current that can be applied because the current mirrors will continue to absorb the input current without causing the system to become nonlinear.

As with the circuits of FIGS. 11 and 13, the use of dual multipliers and dual feedback paths in the circuit of FIG. 14 allows one of the feedback paths to balance any deficit in the other feedback path, thereby providing constant loop gain.

Figure 15:
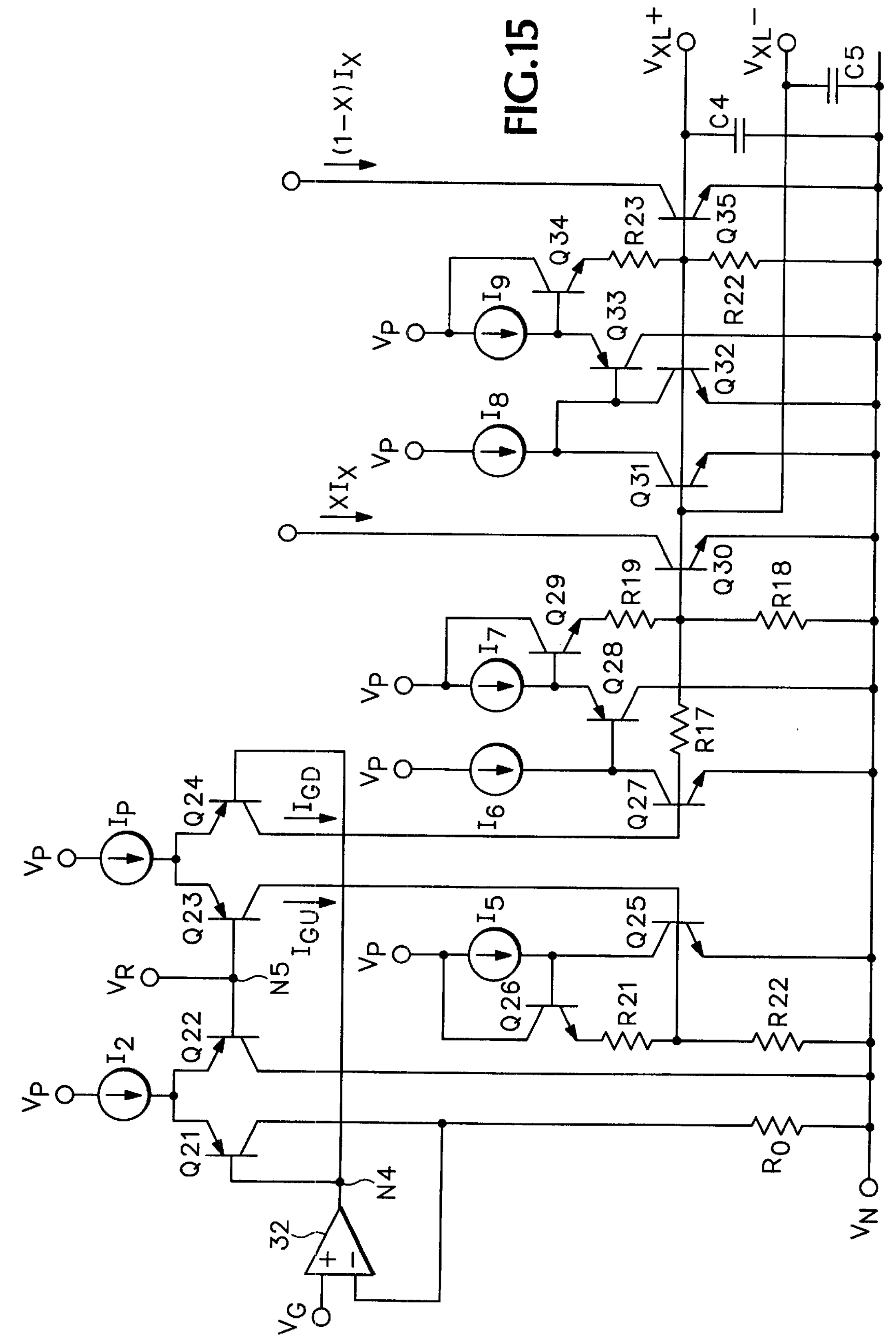
FIGS. 15 and 16 are a schematic diagram of a gain control circuit in accordance with the present invention.
Figure 16:
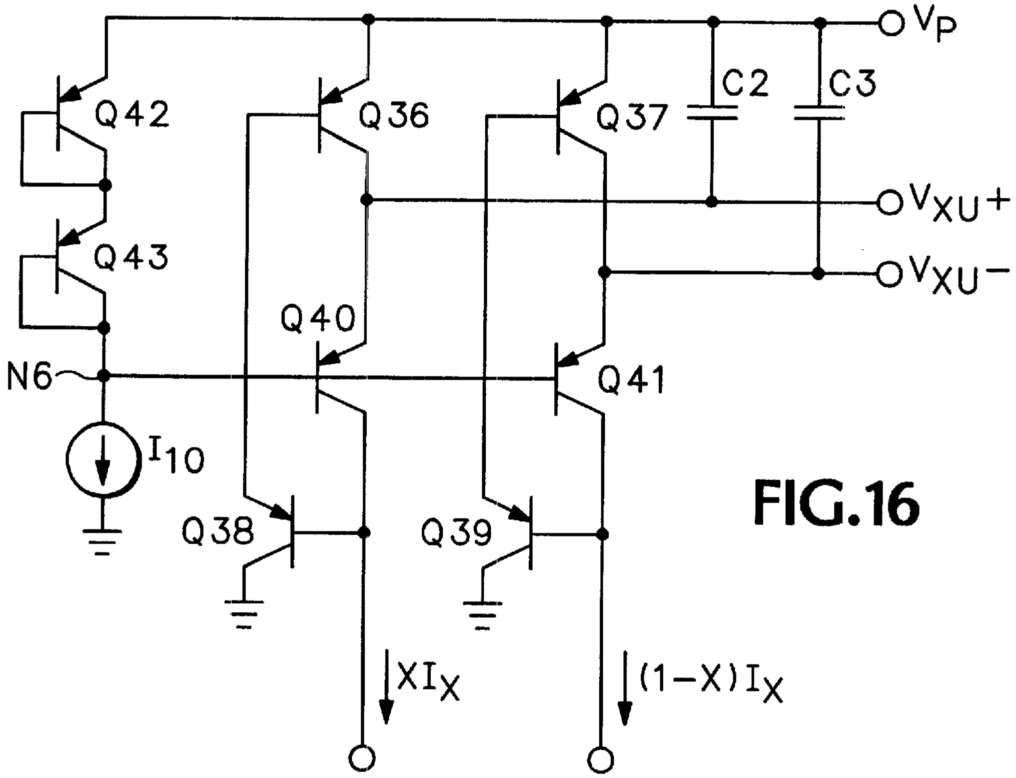

FIGS. 15 and 16 illustrate a gain control circuit suitable for use with the circuit of FIG. 14. The circuit of FIGS. 15 and 16 receives a single-ended gain control signal $V_G$ and generates the two differential gain control signals $V_{XU}$ and $V_{XL}$ which drive the upper and lower multiplier cores, respectively. It provides linear-in-dB gain control, and it is also capable of imparting a temperature dependency to $V_{XU}$ and $V_{XL}$ to compensate for the temperature dependency of the multiplier cores.

Referring to FIG. 15, differential pair Q21, Q22 is biased by a temperature stable current $I_Z$; that is, $I_Z$ has a zero temperature coefficient. Differential pair Q23, Q24 is biased by a current $I_P$ that is proportional to absolute temperature (PTAT). The bases of Q22 and Q23 are connected together at node N5 which receives an anchor voltage $V_R$, while the bases of Q21 and Q24 are connected together at node N4 and driven by operational amplifier (op amp) 32 which receives the gain control signal $V_G$ at its noninverting input. The collector of Q22 is grounded, and the collector of Q21 is coupled to a resistor $R_0$ which generates the inverting input to the op amp 32. Op amp 32 generates a voltage $V_{GB}$ between N4 and N5 so as to maintain the voltage across $R_0$ at the same voltage as the gain control signal $V_G$ The voltage $V_{GB}$ is also applied to Q23, Q24 which generates a pair of currents $I_{GU}$ and $I_{GD}$ which are proportional to absolute temperature. At this point, it would be possible to apply $I_{GU}$ and $I_{GD}$ to a pair of diode-connected transistors to generate the differential voltage $V_{XL}$ which could be used to drive the lower multiplier cores Q5, Q6 and Q7, Q8 in FIG. 14, thereby providing linear gain control. However, the circuit of FIGS. 15 and 16 includes additional circuitry to provide linear-in-dB gain control in an accurate ratiometric manner.

The current $I_{GD}$ is applied to an exponential generator including Q27–Q30 and R17–R18 which is similar in operation to that described in U.S. Pat. No. 5,572,166 titled Linear-in-Decibel Variable Gain Amplifier by the same inventor as the present invention. The current $XI_X$ generated at the collector of Q30 is PTAT and linear-in-dB with respect to $V_G$. By including the additional transistor Q31, the exponential generator also functions as part of a ratiometric current generator similar to those described in U.S. patent application Ser. No. 09/466,050, filed Dec. 17, 1999 entitled "Interpolator Having Dual Transistor Ranks and Ratiometric Control" by the same inventor as the present application and which is incorporated by reference. That is, Q31 and Q32 split the current $I_8$ in a ratio that varies in response to $V_G$. Transistor Q35 forms a current mirror with Q32 and generates the complementary current $(1-X)I_X$.

Transistors Q28 and Q29 provide beta compensation for the exponential generator, while Q33 and Q34 provide beta compensation for the Q32, Q35 current mirror. The current $I_{GU}$ could simply be diverted to ground, but to improve accuracy, Q25, Q26, R20, R21, and $I_5$ are arranged in a similar manner to the corresponding components in the exponential generator so that collector voltages of Q23 and Q24 are equal.

The gain control signals $V_{XL}+$ and $V_{XL}-$ for the lower multiplier cores can now be taken directly from the bases of Q35 and Q30, respectively, with capacitors C4 and C5 providing a very low impedance high frequency path. The gain control signals $V_{XL}+$ and $V_{XL}-$ are temperature compensated, ratiometric, and linear-in-dB with respect to $V_G$. Thus, the circuit of FIG. 15 combines several useful functions to provide accurate control of the lower multiplier cores from a single gain control signal $V_G$.

To drive the upper multiplier cores in FIG. 14, the circuit of FIG. 16 utilizes the ratiometric currents $XI_X$ and $(1-X)I_X$ from the circuit of FIG. 15 to generate the upper gain control signals $V_{XU}+$ and $V_{XU}-$. Diode connected transistors Q42 and Q43 and current source $I_9$ provide an anchor voltage at node N6 for grounded base transistors Q40 and Q41. Since the bases of Q40 and Q41 are connected together, they generate a $\Delta V_{BE}$ signal $V_{XU}$ that depends on the difference between the currents $XI_X$ and $(1-X)I_X$ which are provided by Q36 and Q37 with the help of beta compensation transistors Q38 and Q39. Capacitors C2 and C3 provide firm AC grounds at $V_{XU}+$ and $V_{XU}-$.

Having described and illustrated the principles of the invention in a preferred embodiment thereof, it should be apparent that the invention can be modified in arrangement and detail without departing from such principles. For example, certain signals in the embodiments described above are illustrated as voltages or currents. However, the present invention is not limited to specific voltage or current mode signals. As a further example, the circuit of FIG. 14 is operated from positive and negative supplies $V_P$ and $V_N$ with the nodes N1 and N2 connected to system ground. Alternatively, the circuit could be operated from a single supply voltage with nodes N1 and N2 held at a midpoint reference.

Although the gain control signals are preferably ratiometric (e.g., X and 1 −X), the present invention is not limited to circuits that utilize ratiometric gain control signals. Furthermore, the multiplier cores shown in FIGS. 13 and 14 are differential pairs, but other types of multipliers are contemplated by the present invention. The manner in which the multiplier cores are driven can also be modified. For Example, in the circuits of FIGS. 13 and 14, the gain control signals are applied to the bases of the differential pairs, while the input and feedback signals are used to control the bias current through the pair. However, the signals could be applied in the opposite manner.

Some of the many other modifications that are contemplated by the present invention are as follows: CMOS or other devices can be utilized instead of the BJT transistors illustrated above; input stages other than gm cells or current conveyers can be used; the feedback paths can any type of generalized feedback network rather than simple resistors or wire connections; the buffer amplifier can be realized with any amount of gain, and in some applications it might be possible to eliminate it completely.

I claim all modifications and variations coming within the spirit and scope of the following claims.

What is claimed is:

1. A circuit comprising:

a first feedback multiplier constructed and arranged to generate a first output signal responsive to a first input signal and a feedback signal;

a second feedback multiplier constructed and arranged to generate a second output signal responsive to a second input signal that is different from the first input signal, and a feedback signal; and a feedback network constructed and arranged to generate the feedback signal responsive to the first and second output signals.

2. A circuit according to claim 1 wherein the first and second feedback multipliers are coupled together and arranged to provide variable gain with constant bandwidth.

3. A circuit comprising:

a first multiplier;

a second multiplier;

a summing device coupled to the first and second multipliers;

a first feedback path coupled between the summing device and the first multiplier and constructed to feed an analog signal from the summing device back to the first multiplier; and a second feedback path coupled between the summing device and the second multiplier and constructed to feed an analog signal from the summing device back to the second multiplier.

4. A circuit according to claim 3 further comprising a buffer amplifier coupled between the summing device and the first and second feedback paths.

5. A circuit according to claim 3 wherein the summing device is a summing node.

6. A circuit according to claim 3 wherein the second multiplier has a signal input that is AC grounded.

7. A circuit comprising:

a first multiplier;

a second multiplier;

a summing device coupled to the first and second multipliers;

a first feedback path coupled between the summing device and the first multiplier; and a second feedback path coupled between the summing device and the second multiplier;

wherein each of the multipliers comprises:

a first multiplier core; and an input stage coupled to the multiplier core.

8. A circuit according to claim 7 wherein the first multiplier core comprises a differential pair or transistors.

9. A circuit according to claim 7 wherein the input stage comprises a transconductance cell.

10. A circuit according to claim 7 wherein the input stage comprises a current conveyor.

11. A circuit according to claim 7 wherein each of the multipliers further comprises a second multiplier core coupled to the input stage.

12. A circuit according to claim 11 wherein the first and second multiplier cores have complementary symmetry.

13. A circuit comprising:

a first multiplier;

a second multiplier;

a summing device coupled to the first and second multipliers;

a first feedback path coupled between the summing device and the first multiplier;

a second feedback path coupled between the summing device and the second multiplier; and a gain control circuit coupled to the first and second multipliers.

14. A circuit according to claim 13 wherein the gain control circuit is adapted to provide ratiometric gain control to the first and second multipliers.

15. A circuit according to claim 13 wherein the gain control circuit is adapted to provide linear-in-dB gain responsive to a gain control signal.

16. A method comprising:

multiplying a first input signal with a first multiplier, thereby generating a first output signal;

multiplying a second input signal with a second multiplier, thereby generating a second output signal;

combining the first and second output signals, thereby generating an analog feedback signal;

applying the analog feedback signal to the first multiplier; and applying the analog feedback signal to the second multiplier.

17. A method according to claim 16 wherein combining the first and second output signals comprises summing the first and second output signals.

18. A circuit according to claim 16 wherein the second input signal is an AC ground.

19. A circuit comprising:

a first multiplier;

a second multiplier;

a summing device coupled to the first and second multipliers;

a first feedback path coupled between the summing device and the first multiplier; and a second feedback path coupled between the summing device and the second multiplier;

wherein the first multiplier is constructed and arranged to operate responsive to a first input signal, a feedback signal from the first feedback path, and a first gain control signal; and wherein the second multiplier is constructed and arranged to operate responsive to a second input signal, a feedback signal from the second feedback path, and a second gain control signal.

20. A circuit according to claim 19 wherein the second input signal is an AC ground.

21. A method comprising:

multiplying a first input signal with a first multiplier, thereby generating a first output signal;

multiplying a second input signal with a second multiplier, thereby generating a second output signal;

combining the first and second output signals;

applying a feedback signal to the first multiplier; and applying the feedback signal to the second multiplier;

wherein multiplying the first input signal comprises:

applying a first control signal to a first differential pair of transistors; and biasing the first differential pair of transistors responsive to the first input signal and the feedback signal.

22. A method according to claim 21 wherein multiplying the second input signal comprises:

applying a second control signal to a second differential pair of transistors; and biasing the second differential pair of transistors responsive to the second input signal and the feedback signal.

23. A method according to claim 22 further comprising combining output signals from the first and second differential pairs of transistors in anti-phase.

24. A method according to claim 21 wherein applying a feedback signal to the first multiplier comprises conveying the feedback signal to a multiplier core.

25. A circuit comprising:

a first feedback multiplier having a first multiplier core coupled to a first input stage; and a second feedback multiplier having a second multiplier core coupled to a second input stage;

wherein the first and second multiplier cores are coupled together in anti-phase.

26. A circuit according to claim 25 wherein:

the first multiplier further comprises a third multiplier core coupled to the first input stage and having a complementary symmetry to the first multiplier core; and the second multiplier further comprises a fourth multiplier core coupled to the second input stage and having a complementary symmetry to the second multiplier core.

27. A circuit according to claim 26 wherein the first and second input stages are current conveyors.

28. A circuit according to claim 25 further comprising a summing device coupled to the first and second multipliers.

29. A circuit according to claim 28 further comprising a first feedback path coupled between the summing device and the first input stage.

30. A circuit according to claim 29 further comprising a second feedback path coupled between the summing device and the second input stage.

31. A circuit according to claim 26 further comprising:

a first current mirror coupled between the first and second multiplier cores and a node; and a second current mirror coupled between the third and fourth multiplier cores and the node.

32. A circuit according to claim 31 further comprising a buffer amplifier coupled to the node.

33. A circuit according to claim 31 further comprising a capacitor coupled to the node.

34. A circuit according to claim 25 further comprising a gain control circuit coupled to the first and second multipliers.

35. A circuit comprising:

a first multiplier;

a second multiplier;

a summing device coupled to the first and second multipliers;

a first feedback path coupled between the summing device and the first multiplier; and a second feedback path coupled between the summing device and the second multiplier;

wherein the first and second feedback paths comprise first and second resistors, respectively.

36. A method comprising:

multiplying a first input signal with a first multiplier, thereby generating a first output signal;

multiplying a second input signal with a second multiplier, thereby generating a second output signal;

combining the first and second output signals;

applying a feedback signal to the first multiplier; and applying the feedback signal to the second multiplier;

wherein multiplying the first input signal comprises multiplying the first input signal by a first gain control signal.

37. A method according to claim 36 wherein multiplying the second input signal comprises multiplying the second input signal by a second gain control signal.

38. A method according to claim 37 wherein the first and second gain control signals are ratiometric.

* * * * *